US012803215B2

(12) United States Patent
Lee et al.

(10) Patent No.: US 12,803,215 B2
(45) Date of Patent: Nov. 17, 2026

(54) WATERPROOF CONNECTOR AND BATTERY MODULE INCLUDING THE SAME

(71) Applicant: LG ENERGY SOLUTION, LTD., Seoul (KR)

(72) Inventors: Hyun-Jong Lee, Daejeon (KR); Jae-Sang Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 348 days.

(21) Appl. No.: 18/681,393

(22) PCT Filed: Dec. 2, 2022

(86) PCT No.: PCT/KR2022/019520
§ 371 (c)(1),
(2) Date: Feb. 5, 2024

(87) PCT Pub. No.: WO2023/106751
PCT Pub. Date: Jun. 15, 2023

(65) Prior Publication Data
US 2025/0132520 A1 Apr. 24, 2025

(30) Foreign Application Priority Data
Dec. 9, 2021 (KR) ........................ 10-2021-0176160

(51) Int. Cl.
*H01R 13/52* (2006.01)
*H01M 50/296* (2021.01)
*H01R 43/00* (2006.01)

(52) U.S. Cl.
CPC ........ *H01R 13/521* (2013.01); *H01M 50/296* (2021.01); *H01R 13/5205* (2013.01); *H01R 43/005* (2013.01)

(58) Field of Classification Search
CPC .............. H01R 43/005; H01R 13/5205; H01R 13/521; H01M 50/296
(Continued)

(56) References Cited

U.S. PATENT DOCUMENTS 4,131,331 A * 12/1978 Kendall, Jr. ........... H01R 13/52 174/541
6,064,003 A 5/2000 Moore et al.
(Continued)

FOREIGN PATENT DOCUMENTS

CN 201717441 U 1/2011
CN 102074842 A 5/2011
(Continued)

OTHER PUBLICATIONS

Office Action dated Feb. 12, 2025 issued in corresponding Japanese Patent Application No. 2024-504552. (Note: JP 2017-073402 A cited in this JP Office Action was cited in a prior IDS.).
(Continued)

*Primary Examiner* — Tulsidas C Patel
*Assistant Examiner* — Jeffrey Mountain
(74) *Attorney, Agent, or Firm* — Morgan, Lewis & Bockius LLP

(57) ABSTRACT

A waterproof connector includes at least one connector terminal, a connector housing including a connecting portion formed on a front surface to connect another connector and an opening portion formed on a rear surface to form an open space through which the connector terminal is exposed, a connector cable connected to a side of the connector terminal exposed through the opening portion, and a bag molding member which is an injection molded product, the bag molding member surrounding and sealing the opening portion.

19 Claims, 6 Drawing Sheets

(58) Field of Classification Search
USPC .......................................................... 439/660
See application file for complete search history.

(56) References Cited

U.S. PATENT DOCUMENTS

| | | | | |
|---|---|---|---|---|
| 11,152,740 | B2* | 10/2021 | Xu | H01R 13/5216 |
| 2003/0129875 | A1 | 7/2003 | Ho | |
| 2005/0255748 | A1 | 11/2005 | Kameyama et al. | |
| 2011/0104924 | A1 | 5/2011 | Matsuoka et al. | |
| 2012/0094539 | A1 | 4/2012 | Ooki | |
| 2014/0113497 | A1* | 4/2014 | Wang | H01R 13/504 439/660 |
| 2018/0190965 | A1 | 7/2018 | Lee et al. | |
| 2019/0025674 | A1 | 1/2019 | Hwang et al. | |
| 2019/0067872 | A1 | 2/2019 | Cha et al. | |
| 2021/0119374 | A1* | 4/2021 | Wan | H01R 43/18 |
| 2021/0336375 | A1 | 10/2021 | Geoffroy et al. | |
| 2022/0367954 | A1 | 11/2022 | Lee et al. | |

FOREIGN PATENT DOCUMENTS

| | | | |
|---|---|---|---|
| CN | 102471557 | A | 5/2012 |
| CN | 107836048 | A | 3/2018 |
| CN | 109361012 | A | 2/2019 |
| CN | 209805042 | U | 12/2019 |
| CN | 109361096 | B | 7/2020 |
| JP | 2004-039612 | A | 2/2004 |
| JP | 2005-327570 | A | 11/2005 |
| JP | 2007-200820 | A | 8/2007 |
| JP | 2009-093935 | A | 4/2009 |
| JP | 2017-73402 | A | 4/2017 |
| JP | 2018-530877 | A | 10/2018 |
| JP | WO2019/044010 | A1 | 3/2019 |
| JP | 2019-169344 | A | 10/2019 |
| KR | 10-0919952 | B1 | 10/2009 |
| KR | 10-1578057 | B1 | 12/2015 |
| KR | 10-2017-0084549 | A | 7/2017 |
| KR | 10-1951677 | B1 | 2/2019 |
| KR | 10-2021-0067888 | A | 6/2021 |

OTHER PUBLICATIONS

The extended European Search Report (EESR), dated Nov. 12, 2024, issued in corresponding EP Patent Application No. 22904581.0.

International Search Report (with partial translation) and Written Opinion for PCT/KR2022/019520 dated Mar. 20, 2023.

Office Action dated Apr. 11, 2026 issued in the corresponding Chinese Patent Application No. 202280055821.8. (Note: CN 201717441 U and US 2021/0336375 A1 cited in this CN Office Action have already been cited in prior IDSs and considered.).

* cited by examiner

WATERPROOF CONNECTOR AND BATTERY MODULE INCLUDING THE SAME

TECHNICAL FIELD

The present application is a U.S. National Stage of PCT International Application No. PCT/KR2022/019520, filed on Dec. 2, 2022, which claims priority to Korean Patent Application No. 10-2021-0176160, filed on Dec. 9, 2021, in the Republic of Korea, the disclosures of which are incorporated herein by reference.

The present application claims priority to Korean Patent Application No. 10-2021-0176160, filed on Dec. 9, 2021, in the Republic of Korea, the disclosures of which are incorporated herein by reference.

BACKGROUND ART

Types of secondary batteries that are currently widely used include lithium-ion batteries, lithium polymer batteries, nickel cadmium batteries, nickel hydride batteries, and nickel zinc batteries. An operating voltage of a unit secondary battery, that is, a unit battery cell, ranges from about 2.5 V to about 4.2 V. Accordingly, a battery pack is mounted on a device requiring a high output voltage and capacity such as an electric vehicle.

A battery pack generally includes one or more battery modules in which a plurality of battery cells are connected in series/parallel. Also, a battery module or a battery pack includes a sensing member for measuring voltages and temperatures of a plurality of battery cells, a battery management system (BMS) capable of voltage balancing and temperature control functions, and a cable and a connector for transmitting voltage and temperature information from the sensing member to the BMS.

Because a battery pack of an electric vehicle may be exposed to various environmental conditions, various electronic components need to be designed to cope with the various environmental conditions. For example, it is preferable that a battery module includes electronic components with waterproof performance above a certain level so that the battery module operates without abnormality even in snowy, rainy, or very humid environmental conditions.

In particular, in a battery module, as shown in FIG. 1, because a connector 1 is located inside and outside a module case to function as a passage through which moisture may be introduced, it is preferable that the connector 1 having waterproof performance is used. However, there are not many waterproof connector products that are currently developed. Also, even when an existing non-waterproof connector of a battery module is to be replaced with a new waterproof connector, it is not easy to install the new waterproof connector in place of the existing non-waterproof connector due to a structural difference between the existing non-waterproof connector and the new waterproof connector. Accordingly, there is a need for a method of using an existing non-waterproof connector by adding waterproof performance to the existing non-waterproof connector.

DISCLOSURE

Technical Objective

The present disclosure is designed to solve the problems of the related art, and therefore the present disclosure is directed to using an existing non-waterproof connector as a waterproof connector by adding a waterproof structure to the existing non-waterproof connector.

However, technical objectives to be achieved by the present disclosure are not limited thereto, and other unmentioned technical objectives will be apparent to one of ordinary skill in the art from the description of the present disclosure.

Technical Solution

In one aspect of the present disclosure, there is provided a waterproof connector including at least one connector terminal, a connector housing including a connecting portion formed on a front surface to connect another connector and an opening portion formed on a rear surface to form an open space through which the connector terminal is exposed, a connector cable connected to a side of the connector terminal exposed through the opening portion, and a bag molding member which is an injection molded product, the bag molding member surrounding and sealing the opening portion.

The bag molding member may be made by injection molding to fill the open space and cover the rear surface of the connector housing.

The connector cable may pass through the bag molding member and extend to an outside of the bag molding member.

The bag molding member may be made of a waterproof material.

The bag molding member may be provided by injection molding on the rear surface of the connector housing to surround a circumference of one side of the connector cable.

The connector housing and the bag molding member may be double injection molded products.

According to another aspect of the present disclosure, there is provided a method of manufacturing a waterproof connector, the method including preparing a connector housing including a connecting portion on a front surface and an opening portion on a rear surface, assembling an electric connection terminal on the connector housing, and injection molding a bag molding member on the rear surface of the connector housing to seal the opening portion.

The electrical connection terminal may include a connector terminal formed of a metal material and having a part that is fixedly mounted in the connector housing and a remaining part that is exposed through the opening portion, and a connector cable connected to a side of the connector terminal.

The connector cable may pass through the bag molding member, and the bag molding member may be injection molded on the rear surface of the connector housing to surround a circumference of one side of the connector cable.

According to another aspect of the present disclosure, there is provided a battery module including the waterproof connector.

Advantageous Effects

According to an aspect of the present disclosure, an existing non-waterproof connector may be used as a waterproof connector by adding a waterproof structure to the existing non-waterproof connector.

For example, in a battery module using an existing non-waterproof connector, when the non-waterproof connector is to be replaced with a connector having a waterproof function, according to the present disclosure, the existing non-waterproof connector may be re-used as a waterproof connector by adding a bag molding member to the non-waterproof connector.

The present disclosure may have various other effects, which will be described in each embodiment, or descriptions of effects that may be easily inferred by one of ordinary skill in the art will be omitted.

MODES FOR PRACTICING THE DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings but be interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the present disclosure, so it should be understood that other equivalents and modifications could be made thereto without departing from the scope of the present disclosure.

Figure 1:
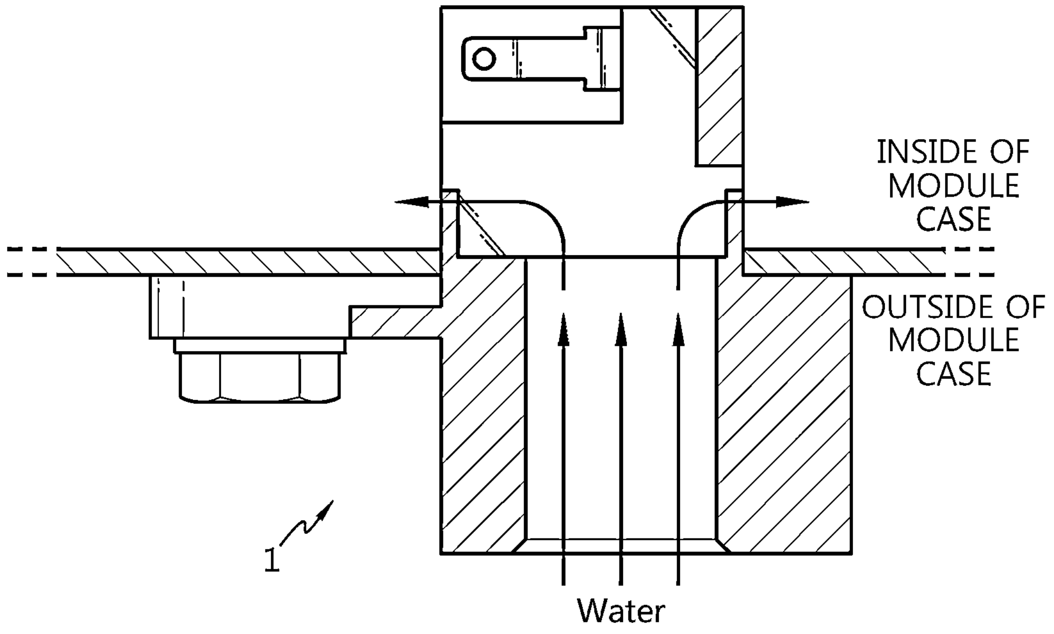
FIG. 1 RELATED ART
FIG. 1 is a cross-sectional view schematically illustrating a non-waterproof connector according to a related art applied to a battery module.
Figure 2:
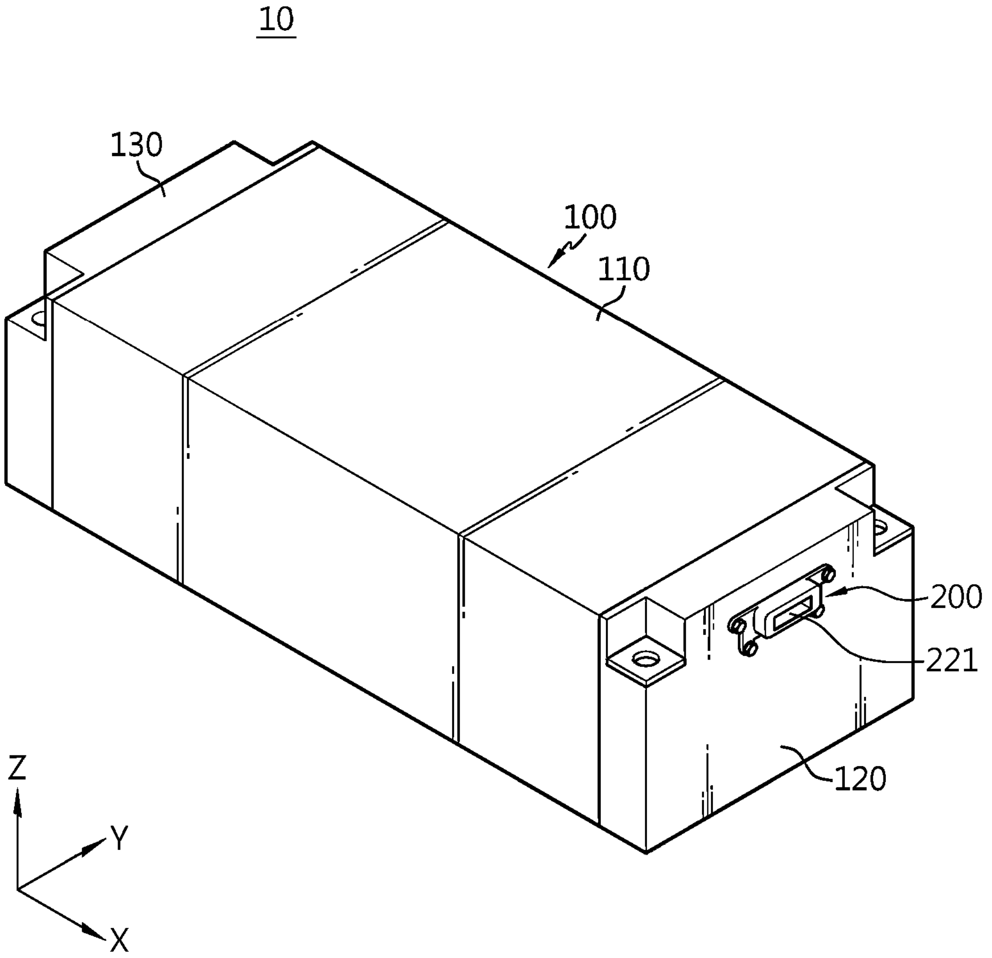
FIG. 2 is a perspective view schematically illustrating a battery module to which a waterproof connector is applied, according to an embodiment of the present disclosure.
Figure 3:
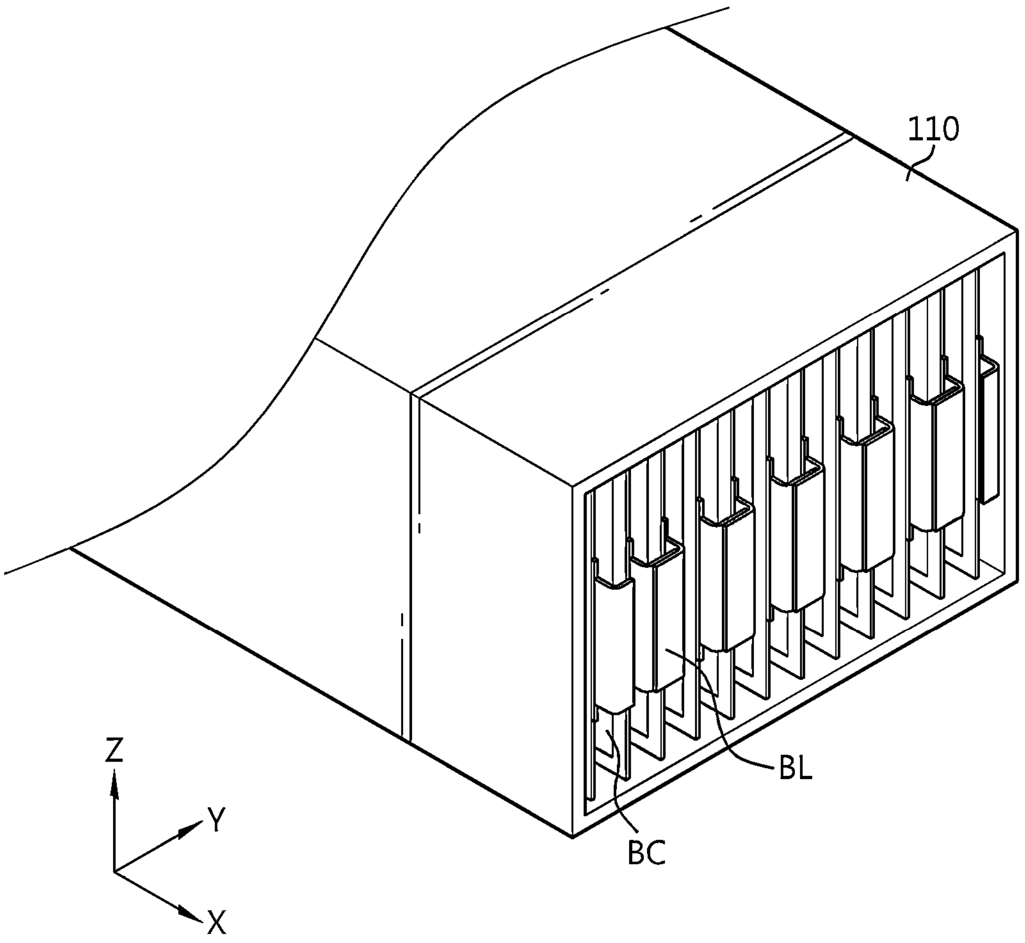
FIG. 3 is a view schematically illustrating battery cells accommodated in a module case, according to an embodiment of the present disclosure.

FIG. 2 is a perspective view schematically illustrating a battery module to which a waterproof connector is applied, according to an embodiment of the present disclosure. FIG. 3 is a view schematically illustrating battery cells accommodated in a module case, according to an embodiment of the present disclosure.

A battery module 10 according to an embodiment of the present disclosure includes a module case 100 and a waterproof connector 200 mounted on a side of the module case 100, as shown in FIG. 2. Although not shown for convenience of illustration, the battery module 10 further includes battery cells BC, a sensing unit for sensing voltages and/or temperatures of the battery cells BC, bus bars for electrically connecting the battery cells BC, a cooling unit, etc.

For example, the battery cell BC that has a thin plate-shaped body may be a pouch-type secondary battery. The pouch-type secondary battery includes a pouch case, and an electrode assembly and an electrolyte accommodated in the pouch case. For example, the pouch case may include two sheets, and a concave inner space may be formed in at least one of the two sheets. The electrode assembly may be accommodated in the inner space of the pouch. Circumferences of the two sheets may be fused to each other to seal the inner space in which the electrode assembly is accommodated. An electrode lead BL may be attached to the electrode assembly, and the electrode lead BL may be located between fused portions of the pouch case and exposed to the outside of the pouch case to function as an electrode terminal of the pouch-type secondary battery. Such pouch-type secondary batteries may be erected in an up-down direction and stacked in a left-right direction to form a stack structure as shown in FIG. 3, and may be collectively accommodated in the module case 100.

Unlike in the present embodiment, a cylindrical secondary battery or a prismatic secondary battery in which a case is formed of a metal can may be employed as the battery cell BC. That is, any of various battery cells BC known at the time of filing the present application may be employed in the battery module 10 of the present disclosure.

The module case 100 includes a main housing 110, a front cover 120, and a rear cover 130.

The main housing 110 may have a certain length (in an X-axis direction), and may have a substantially rectangular tubular shape with open front and rear sides in a longitudinal direction. Also, the main housing 110 may be formed of a metal material or a non-metal material having excellent mechanical rigidity to protect a cell assembly from external physical and chemical elements.

For reference, in the main housing 110, parts covering upper and lower portions of the cell stack including the battery cells BC are referred to as upper and lower plates and parts covering both side surfaces of the cell stack are referred to as left and right side plates, the main housing 110 has a so-called mono frame shape in which the upper plate, the lower plate, the left side plate, and the right side plate are all integrated. As an alternative to the main housing 110 having the mono frame shape, the main housing 110 in which a lower plate is coupled by using welding or the like to a so-called U-shaped frame in which an upper plate, a left side plate, and a right side plate are integrated may be employed.

Because the main housing 110 has a structure in which four sides are sealed, moisture and other foreign materials from the outside of the battery module 10 are not introduced into the main housing 110.

The front cover 120 and the rear cover 130 are structures respectively coupled to the open front and rear sides of the main housing 110 to shield exposure of the bus bars and the electrode leads BL. In the pouch-type secondary batteries, the electrode leads BL are welded to the bus bars (not shown) in a pre-determined pattern for electrical connection and are inserted into the main housing 110. In this case, the electrode leads BL and the plurality of bus bars are located on the front and rear sides of the main housing 110. Next, the front cover 120 and the rear cover 130 are respectively coupled to the front and rear sides of the main housing 110 so that the electrode leads BL and the bus bars are shielded from being exposed to the outside.

Although not shown for convenience of illustration, a sensing component for sensing states (voltages or temperatures) of the battery cells BC may be further provided in the module case 110, and the sensing component may be electrically connected to the waterproof connector 200.

The waterproof connector 200 is provided on a side of the module case 100 (an upper end of the front cover 120 in the present embodiment) so that a part of the waterproof connector 200 is located in the module case 100 and the remaining part is exposed to the outside of the module case 100. Another connector (e.g., a male connector when the waterproof connector 200 of the present embodiment is a female connector) is connected to the waterproof connector 200 to transmit state information of the battery cells BC to a control device outside the module case 100.

The waterproof connector 200 according to an embodiment of the present disclosure has a waterproof structure for preventing moisture or other foreign materials from being introduced into the module case 100. A configuration of the waterproof connector 200 will be described in more detail with reference to FIGS. 4 to 6.

Figure 4:
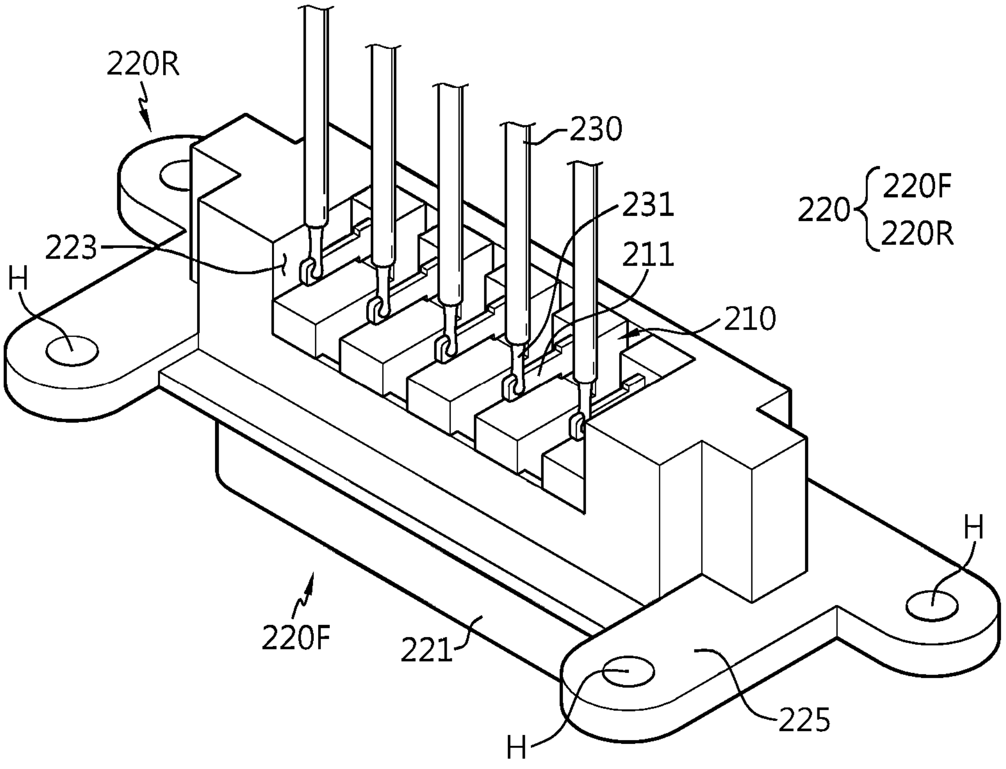
FIG. 4 is a view illustrating a rear surface of a waterproof connector before a bag molding member is applied, according to an embodiment of the present disclosure.
Figure 5:
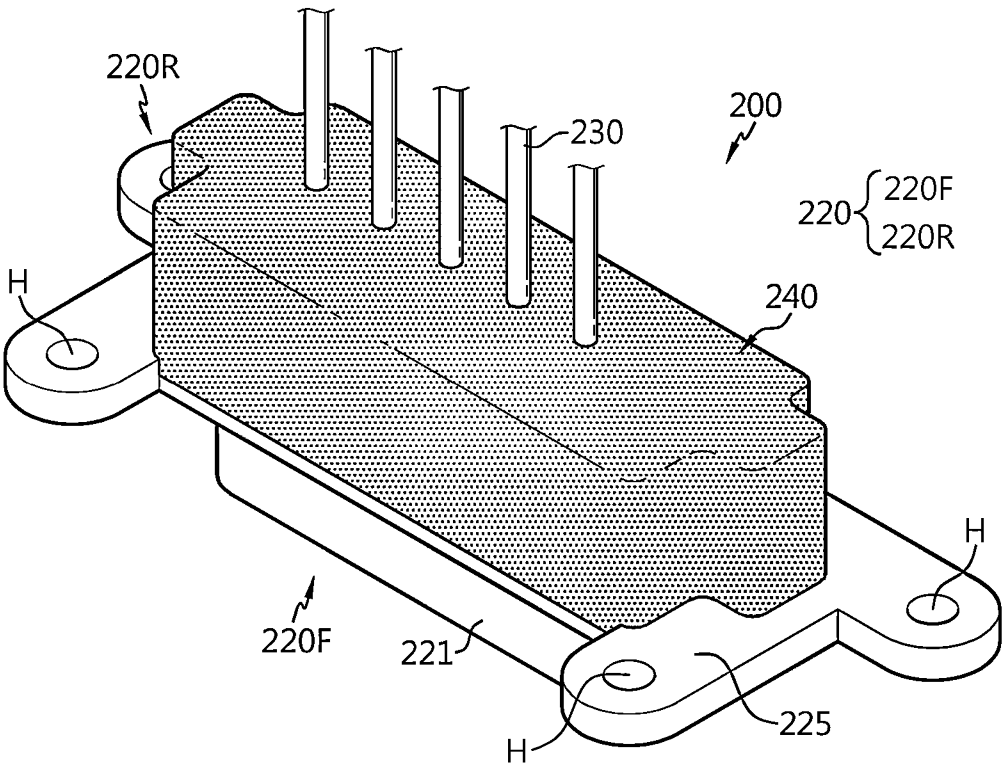
FIG. 5 is a view illustrating a rear surface of a waterproof connector after a bag molding member is applied, according to an embodiment of the present disclosure.

Referring to FIGS. 4 and 5, the waterproof connector 200 includes at least one connector terminal 210, a connector housing 220, a connector cable 230, and a bag molding member 240.

The connector terminal 210 that is a connection terminal for transmitting an electrical signal may be formed of a metal material such as copper or aluminum.

The connector terminal 210 may be inserted into and fixed to the connector housing 220 so that a side of the connector terminal 210 faces a connecting portion 221 of the connector housing 220 and the other side of the connector terminal 210 faces an opening portion 223 of the connector housing 220 described below.

Also, the connector terminal 210 includes a connection pin 211 provided close to the opening portion 223 and protruding in a cantilever shape from the body, as shown in FIG. 4. The connection pin 211 may be used to connect the connector cable 230 to the connector terminal 210. For example, the connector terminal 210 and the connector cable 230 may be electrically connected by soldering an end 231 of the connector cable 230 having the sheath removed to the connection pin 211 of the connector terminal 210. In this structure, the waterproof connector 200 of the present embodiment is configured to connect five connector terminals 210 to five connector cables 230. The five connector cables 230 may extend to a circuit board (sensing component) at a specific position in the module case 100.

The connector housing 220 includes the connecting portion 221 formed on a front surface 220F to connect another connector, the opening portion 223 formed on a rear surface 220R to form an open space through which the connector terminal 210 is exposed, and a mounting plate portion 225 that protrudes from an outer surface in a direction intersecting the connecting portion 221.

The mounting plate portion 225 includes fastening holes H for fastening bolts at ends and is used to fix the waterproof connector 200 to a side of the module case 100.

The connector housing 220 may be manufactured by using injection molding, and preferably, may be formed of plastic having high hardness.

The connecting portion 221 may have a plug-in structure in which a portion of another connector may be inserted. For example, when the waterproof connector 200 is assembled on the module case 100, the connecting portion 221 may be exposed to the outside of the module case 100 as shown in FIG. 2.

In other words, the rear surface 220R of the waterproof connector 200 is inserted inward from the outside of the module case 100 through a connector installation hole provided in the front cover 120, and the mounting plate portion 225 is blocked by an outer surface of the front cover 120 and thus the connecting portion 221 is exposed to the outside of the front cover 120. Bolts are inserted into the fastening holes H of the mounting plate portion 225 and fastened to the front cover 120 to fix the mounting plate portion 225. In this configuration, the waterproof connector 200 may be stably fixed to an outer wall of the module case 100, and the front surface 220F of the waterproof connector 200 may be located outside the module case 100 and the rear surface 220R of the waterproof connector 200 may be located inside the module case 100.

Referring back to FIG. 4, the opening portion 223 of the connector housing 220 refers to a portion where the rear surface 220R of the connector housing 220 is opened by an arrangement width of the connector terminals 210, in order to facilitate assembly of the connector terminals 210 and soldering or welding of the connector terminals 210 to the connector cables 230.

Because the opening portion 223 and the connecting portion 221 of the connector housing 220 communicate with each other, moisture or foreign materials may enter the connecting portion 221 and may be introduced into the module case 100 through the opening portion 223. To prevent this, the waterproof connector 200 has a structure in which the opening portion 223 is completely surrounded and sealed by the bag molding member 240 as shown in FIG. 5.

The bag molding member 240 may be provided on the rear surface 220R of the connector housing 220 by using injection molding.

For example, the bag molding member 240 may be integrated with the rear surface 220R of the connector housing 220 by inserting the connector housing 220 into a mold (mold for the bag molding member 240) while the connector cables 230 are connected. As a resin for forming the bag molding member 240, a resin having excellent waterproof performance, for example, a polyurethane resin or a silicone resin, may be used.

The bag molding member 240 according to an embodiment of the present disclosure may be integrated with the connector housing 220 by completely filling the open space formed in the opening portion 223 of the connector housing 220 and covering the rear surface 220R of the connector housing 220, and the connector cable 230 may pass through the bag molding member 240 and may extend to the outside of the bag molding member 240.

Not only an outer surface of the bag molding member 240 shown in FIG. 5 but also the inside of the bag molding member 240 covering the rear surface 220R of the connector housing 220 are completely filled with a resin. For reference, although the inside of the bag molding member 240 covering the rear surface 220R of the connector housing 220 is also completely filled with a resin to maximize waterproof performance in the present embodiment, as an alternative to the present embodiment, the bag molding member 240 may be formed as a hollow cover.

Figure 6:
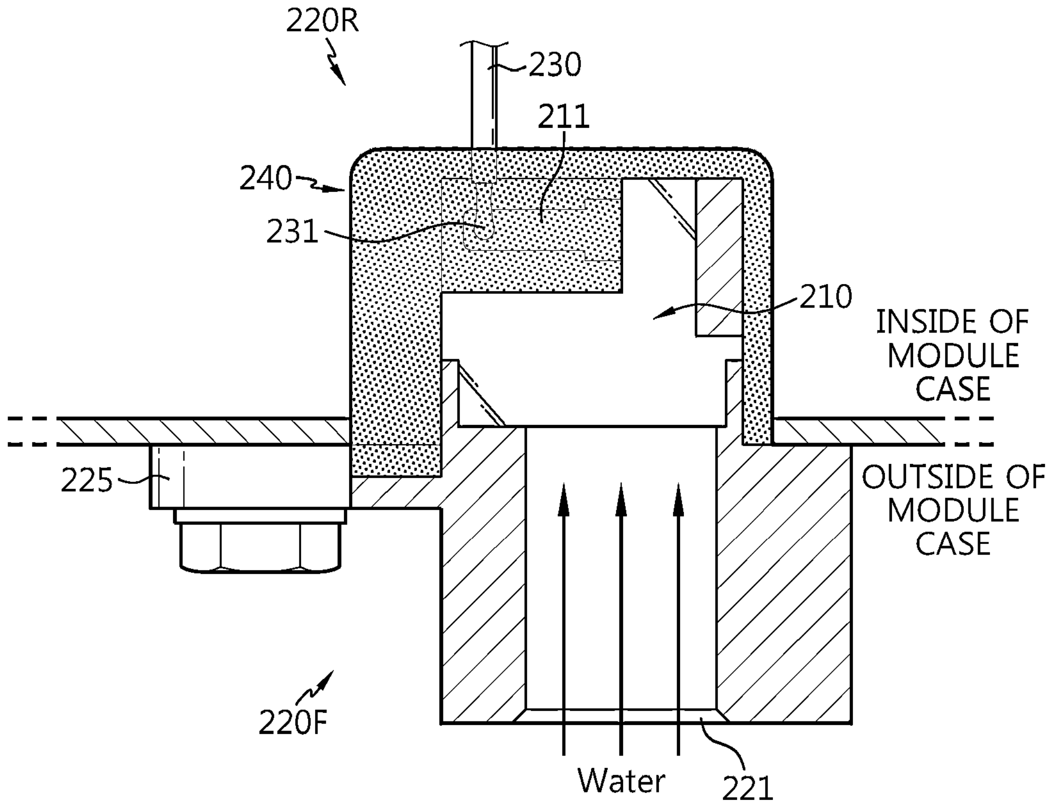
FIG. 6 is a cross-sectional view schematically illustrating a waterproof connector, according to an embodiment of the present disclosure.

Also, referring to FIG. 6, because the bag molding member 240 completely surrounds a circumference of one side of the connector cable 240, airtightness of a portion through which the connector cable 230 passes may also be ensured.

That is, when the bag molding member 240 is injection molded on the rear surface 220R of the connector housing 220, because a polyurethane resin or a silicone resin completely surrounds a circumference of one side of the connector cable 230 and is cured, the circumference of the side of the connector cable 230 and the bag molding member 240 are fixed to each other. The circumference of the side of the connector cable 230 refers to a circumference from an end of the connector cable 230 (having the sheath removed) to a point drawn out to the outside of the bag molding member 240. Accordingly, although the connector cable 230 passes through the bag molding member 240 and extends to the outside, there is no problem with waterproof performance.

Also, because one side of the connector cable 230 is fixed to the bag molding member 240, a connected portion (soldered portion) between the connector cable 230 and the connector terminal 210 is not broken even with strong impact.

According to the configuration of the present disclosure as described above, even when moisture enters the connector housing 220, the moisture is blocked by the bag molding member 240 and does not flow into the module case 100. Also, because a resin is filled in a space between the connector terminals 210 during injection molding, the connector terminals 210 may not be corroded by moisture.

Next, a method of manufacturing the waterproof connector 200 will be briefly described.

A method of manufacturing the waterproof connector 200 according to an embodiment of the present disclosure includes: preparing the connector housing 220 including the connecting portion 221 on the front surface 220F and the opening portion 223 on the rear surface 220R; assembling an electrical connection terminal on the connector housing 220; and injection molding the bag molding member 240 on the rear surface 220R of the connector housing 220 to seal the opening portion 223.

In the preparing of the connector housing 220, the connector housing 220 may be manufactured by using injection molding or the existing connector housing 220 with no waterproof function may be used as it is.

The electrical connection terminal includes the connector terminal 210 formed of a metal material and having a part that is fixedly mounted in the connector housing 220 and the reaming part that is exposed through the opening portion 223, and the connector cable 230 connected to a side of the connector terminal 210.

That is, the electrical connection terminal may refer to the connector terminal 210 and the connector cable 230. Before the bag molding member 240 is injection molded, the connector terminal 210 is assembled on the opening portion 223 of the connector housing 220, and then, the sheath of an end of the connector cable 2230 is removed and the end is soldered to the connection pin 211 of the connector terminal 210.

Next, the connector housing 220 is put into a mold (mold for the bag molding member 240) while the connector cables 230 are connected, and a polyurethane resin or a silicone resin is injected to injection mold the bag molding member 240 on the rear surface 220R of the connector housing 220.

According to the method of manufacturing a waterproof connector as described above, an existing non-waterproof connector may be used as a waterproof connector by adding a waterproof structure to the existing non-waterproof connector structure. For example, in a battery module using an existing non-waterproof connector, when the non-waterproof connector is to be replaced with a connector having a waterproof function, according to the present disclosure, the existing non-waterproof connector may be re-used as a waterproof connector by adding a bag molding member to the non-waterproof connector.

While one or more embodiments of the present disclosure have been described with reference to the figures, the present disclosure is not limited to the above-described specific embodiments, and it will be understood by one of ordinary skill in the art that various changes in form and details may be made therein without departing from the scope as defined by the following claims.

It will be understood by one of ordinary skill in the art that when terms indicating directions such as upper, lower, left, and right are used, these terms are only for convenience of explanation and may vary according to a position of a target object, a position of an observer, etc.

What is claimed is:

1. A waterproof connector, comprising:
a connector housing comprising:
a connecting portion on a front surface to connect to another connector; and
an opening portion on a rear surface and having an open space;
at least one connector terminal fixed to the connector housing and including:
a first side facing the connecting portion and facing away from the opening portion; and
a second side opposite the first side and facing the opening portion, the second side being exposed through the opening portion;
at least one connector cable connected respectively to the second side of the at least one connector terminal exposed through the opening portion; and
a bag molding member surrounding and sealing the opening portion, the bag molding member being injection molded,
wherein the at least one connector terminal includes:
a body fixed to the connector housing and having the first side and the second side; and
a connection pin protruding from the second side of the body in a cantilever shape.

2. The waterproof connector according to claim 1, wherein the bag molding member fills the open space and covers the rear surface of the connector housing.

3. The waterproof connector according to claim 1, wherein the at least one connector cable passes through the bag molding member and extends out of the bag molding member.

4. The waterproof connector according to claim 1, wherein the bag molding member is made of a waterproof material.

5. The waterproof connector according to claim 1, wherein the bag molding member is provided by injection molding on the rear surface of the connector housing to surround a circumference of one side of the at least one connector cable.

6. The waterproof connector according to claim 1, wherein the connector housing and the bag molding member are double injection molded.

7. The waterproof connector of claim 1, wherein the at least one connector terminal includes a metal material and has a part fixedly mounted in the connector housing and a remaining part exposed through the opening portion.

8. A method of manufacturing a waterproof connector, the method comprising:
preparing a connector housing comprising:
a connecting portion on a front surface for connection to another connector; and
an opening portion on a rear surface and having an open space;
assembling an electric connection terminal on the connector housing to be exposed through the open space of the opening portion, the electric connection terminal comprising at least one connector terminal fixed to the connector housing and including:
a first side facing the connecting portion and facing away from the opening portion; and
a second side opposite the first side and facing the opening portion, the second side being exposed through the opening portion; and injection molding a bag molding member on the rear surface of the connector housing to seal the opening portion, wherein the at least one connector terminal includes:

a body fixed to the connector housing and having the first side and the second side; and a connection pin protruding from the second side of the body in a cantilever shape.

9. The method of claim 8, wherein the electrical connection terminal further comprises:

at least one connector cable connected to the second side of the at least one connector terminal, respectively, wherein the at least one connector terminal is formed of a metal material has a part fixedly mounted in the connector housing and a remaining part exposed through the opening portion.

10. The method of claim 9, wherein:

the at least one connector cable passes through the bag molding member, and the injection molding of the bag molding member includes injection molding the bag molding member on the rear surface of the connector housing to surround a circumference of one side of the at least one connector cable.

11. The method of claim 8, wherein the bag molding member is made of a waterproof material.

12. The method of claim 8, wherein the connector housing and the bag molding member are double injection molded.

13. The method of claim 8, wherein the at least one connector terminal does not extend through the connecting portion.

14. The method of claim 8, wherein:

the first side of the at least one connector terminal includes a flat surface facing the connecting portion and facing away from the opening portion; and the second side of the at least one connector terminal includes an L-shaped surface facing the opening portion.

15. The waterproof connector according to claim 1, wherein the at least one connector cable extends in a vertical direction and contacts the connection pin of the at least one connector terminal, respectively, the connection pin extending in a horizontal direction.

16. The waterproof connector according to claim 1, wherein:

the at least one connecter terminal includes a plurality of connector terminals; and the at least one connector cable includes a plurality of connector cables connected respectively to the plurality of connector terminals.

17. The waterproof connector according to claim 1, wherein the at least one connector terminal does not extend through the connecting portion.

18. The waterproof connector according to claim 1, wherein:

the first side of the at least one connector terminal includes a flat surface facing the connecting portion and away from the opening portion; and the second side of the at least one connector terminal includes an L-shaped surface facing the opening portion.

19. A battery module, comprising:

a module case; and a waterproof connector mounted on a side of the module case and including:

a connector housing comprising:

a connecting portion on a front surface to connect to another connector; and an opening portion on a rear surface and having an open space;

at least one connector terminal fixed to the connector housing and including:

a first side facing the connecting portion and facing away from the opening portion; and a second side opposite the first side and facing the opening portion, the second side being exposed through the opening portion;

at least one connector cable connected respectively to the second side of the at least one connector terminal exposed through the opening portion; and a bag molding member surrounding and sealing the opening portion, the bag molding member being injection molded, wherein the connecting portion of the connection housing is disposed outside the module case, and wherein the opening portion of the connection housing, the second side of the at least one connector terminal, and the at least one connector cable are disposed entirely inside the module case.

* * * * *